Sept. 20, 1971     J. R. CRAPO     3,605,526

SAW SHARPENING MACHINE

Filed Oct. 7, 1969                              4 Sheets-Sheet 2

3,605,526
SAW SHARPENING MACHINE
Jesse R. Crapo, Rte. 2, Duluth, Ga. 30136
Filed Oct. 7, 1969, Ser. No. 864,466
Int. Cl. B23d 63/08
U.S. Cl. 76—35                                    20 Claims

ABSTRACT OF THE DISCLOSURE

This invention relates to an automatic sharpening device for use in sharpening a cutting tool having a series of cutting teeth such as carpenter's hand saws, key hole saws, compass saws and fine tooth circle saws. More particularly, this invention includes a base frame for supporting a cutting tool for lateral indexing movement, including controlled indexing means operative to serially present each tooth of the series of cutting teeth to a sharpening position. Mounted on the base frame is a sharpening means such as a file, detailed in supporting relationship relative to the cutting tool for orbital movement in a plane disposed at an angle with respect to the plane of the cutting tool. The sharpening means includes control means operatively associated therewith for effecting the orbital movement of the sharpening means in such a manner that a sharpening of the cutting tooth is accomplished during one portion of the orbital movement and wherein the sharpening means is separated from the cutting tooth during a second portion of the orbital movement. The sharpening means also includes control means for effecting automatic angular adjustment between the plane of the cutting tool and the plane of motion of the sharpening means for the purpose of adjusting the sharpening means to sharpen angular offset cutting edges. The control means for effecting the automatic angular adjustment is detailed to effect the angular adjustment during the second portion of the orbital movement of the sharpening means.

BACKGROUND OF THE INVENTION

A cutting tool, such as a saw, when used regularly will often become dull thereby decreasing the efficiency of the user in performing the cutting job desired. A saw can be sharpened by a file controlled manually. However, this type of sharpening operation is time consuming and often does not produce a sharpened saw having uniformed dimensioned cutting teeth.

There have been numerous attempts to build power controlled saw filing machines. However, most of the machines were difficult to operate insofar as making the correct adjustments to insure an accurate sharpening operation. Most saws are designed to have alternate cutting teeth angularly offset. The existing sharpening machines would only sharpen every other cutting tooth with one machine set-up. After alternate teeth had been sharpened, the machines would have to be manually readjusted to position the file in correct alignment with the offset angle of the alternate unsharpened teeth. There have been some machines designed which would sharpen angular offset cutting teeth in one operation, however such machines required two filing mechanisms. A machine utilizing two filing mechanisms is very expensive and unreliable in operation.

Most of the existing saw sharpening machines included some type of mechanism which would index a supported saw to be sharpened relative to a file, such that each cutting tooth would be serially moved to a sharpening position. However, these indexing mechanisms were unreliable in operation in that they were not capable of indexing a saw properly that had broken or missing cutting teeth. Also, these indexing devices required special adjustment to accommodate saws having variations of spacing of the cutting teeth.

Another problem with the existing saw filing machines involves the saw supporting mechanism. This mechanism would permit an undesirable vibration of the saw during a filing operation.

OBJECTS OF THE INVENTION

It is a primary object of this invention to provide a machine, completely automatic in operation, for sharpening a cutting tool having a series of angular offset cutting teeth.

A further object of this invention is to provide a saw sharpening machine having an automatic angularly adjustable sharpening means.

A still further object of this invention is to provide a selectively adjustable setting means for varying the angular sharpening position of a sharpening means.

Still another object of this invention is to provide a means for supporting and automatically indexing a saw to serially position each saw cutting tooth to a sharpening position.

Another object of this invention is to provide an automatic saw sharpening machine capable of sharpening cutting teeth formed either on a straight line or on a circular path.

A further object of this invention is to provide a saw sharpening machine with means for clamping a saw during a sharpening operation to prevent vibration of the saw.

An additional object of this invention is to provide an automatic saw sharpening machine simple in operation, economical to manufacture and reliable in performance.

SUMMARY OF THE INVENTION

The above stated disadvantage of existing saw filing machines have been overcome by the present invention which includes a base support frame with a subframe pivotally mounted on the base frame. A saw to be sharpened is clamped on a carriage which is supported on the base frame for lateral indexing movement to serially present each saw cutting tooth to a sharpening position. A reciprocating pawl indexing means is operatively associated with the cutting teeth of a supported saw for effecting the indexing movement. A file for use in the sharpening operation is supported on the subframe for orbital movement in a plane disposed at an angle with respect to the plane of a supported saw. Power control means is operatively associated with a supported file for effecting movement of the file in the orbital plane in such a manner that a saw tooth sharpening is effected during one portion of the orbital movement and the file separated from the saw tooth during a second portion of the orbital movement. Power control means is operatively associated with the subframe for effecting an automatic oscillating movement of the subframe relative to the base frame. The control means for effecting the oscillating movement of the subframe is detailed such that an oscillation of the subframe is effected during the second portion of orbital movement of the file. A selectively settable control means is operatively associated with the oscillation control means for varying the degree of oscillation of the subframe relative to the base frame. The controls for the orbital movement of the file and the controls for the oscillating movement of the subframe are detailed such that a supported file will effect a sharpening of one angular cutting tooth during the one portion of the orbital movement and the subframe with supported file will be automatically oscillated to align the file with an adjacent angular offset cutting tooth during the second portion of file orbital movement.

This cycle of operation is automatically repeated as the saw is indexed to effect a complete automatic sharpening of all the cutting teeth of a saw during one set-up operation.

Still other advantages in the details of construction will become apparent in reading the accompanying description of one illustrative embodiment of the invention with reference to the attached drawings wherein like reference characters have been used to refer to like parts throughout the several figures of drawings which are:

DESCRIPTION OF ILLUSTRATIVE EMBODIMENT

Referring now to the drawings, the automatic sharpening device will be described with reference to base frame 20 (FIG. 1), a subframe 30 (FIG. 1), subframe control means 40, 41, etc. (FIGS. 1, 13 and 14), file support and control means 60 (FIGS. 1, 2 and 8), power control means 90 (FIG. 1), saw support means 100 (FIGS. 1 and 8–11) and saw indexing means 180 (FIGS. 2–4).

BASE FRAME

The automatic sharpening device is supported on a base frame 20 (FIG. 1) which includes a pair of horizontally oriented base supports 21, 22. The base supports 21, 22 are fixed together in parallel laterally spaced relationship by a lower cross member 23 formed integral with an intermediate portion of base support 21, 22. Formed integral with base supports 21, 22 adjacent cross member 23 are a pair of vertically extending leg members 24, 25, respectively. The extended ends of leg members 24, 25 are connected together by an integrally formed upper cross member 26.

OSCILLATING SUBFRAME

Figure 1:
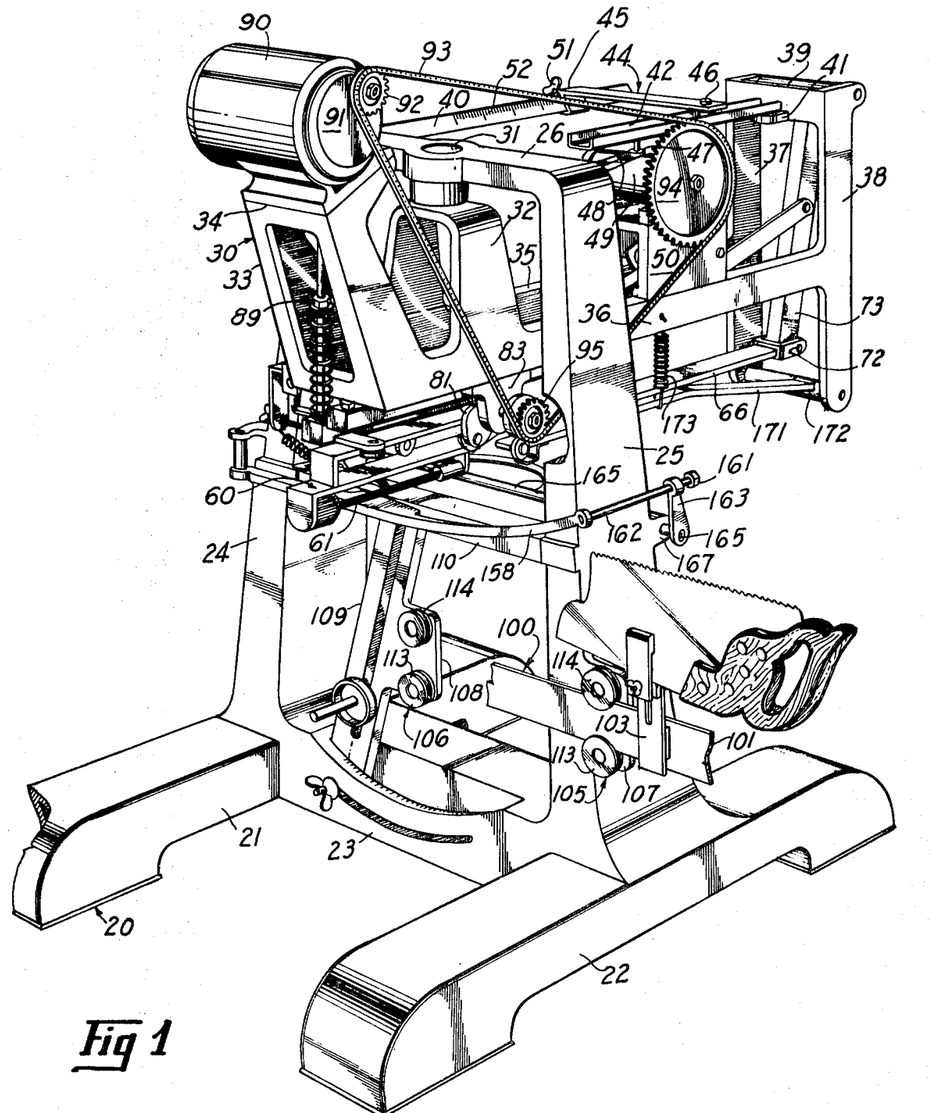
FIG. 1 is a right front perspective view of the machine with certain parts omitted and certain parts broken away and shown in section for purposes of clarity.
Figures 2, 3, 4, 5, 6:
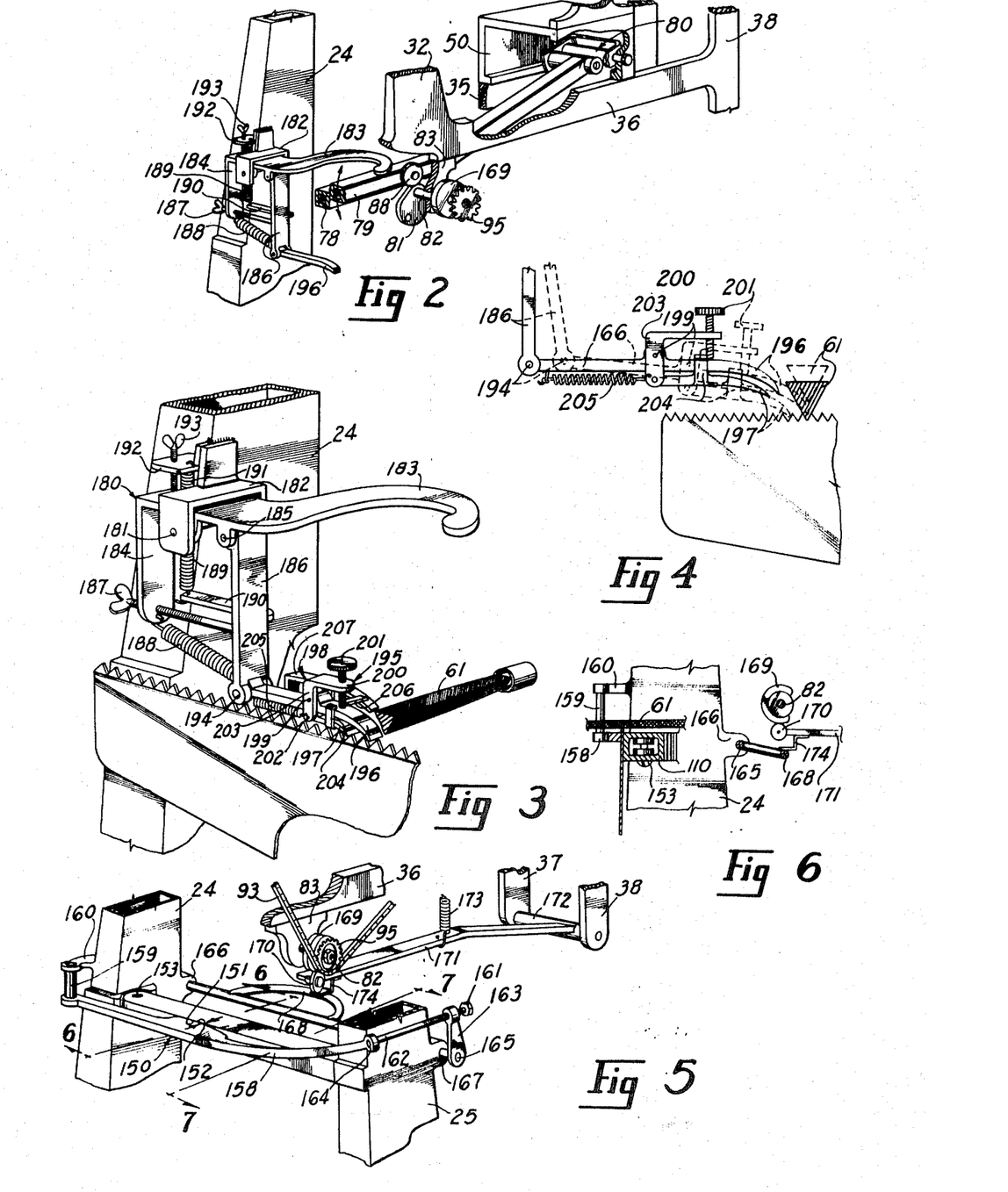
FIG. 2 is a fragmentary perspective view of the indexing control means.
FIG. 3 is a perspective view similar to FIG. 2 with certain parts omitted and drawn on a larger scale to show the relationship of a saw supported to be indexed.
FIG. 4 is a fragmentary front elevational view of FIG. 3.
FIG. 5 is a fragmentary perspective view of the machine showing the saw vise clamping means and controls therefor.
FIG. 6 is a vertical sectional view taken along lines 6—6 of FIG. 5.

Referring particularly to FIG. 1, the subframe 30 is constructed as an integral unit and is pivotally supported on the base frame upper cross member 26 by a conventional pivotal connection 31 which is secured to an intermediate upstanding bracket 32 formed on subframe 30. The subframe 30 includes a forwardly and upwardly projecting bracket 33 which provides a motor supporting surface 34. Extending rearwardly from intermediate bracket 32 in substantially parallel relationship are a pair of arms 35, 36 which terminate in a pair of vertically oriented T-shaped members 37, 38, respectively. The upwardly projecting leg of each of the T-shaped members 37, 38 are connected together by an integrally formed cross member 39.

SUBFRAME OSCILLATING CONTROL MEANS

Figure 13:
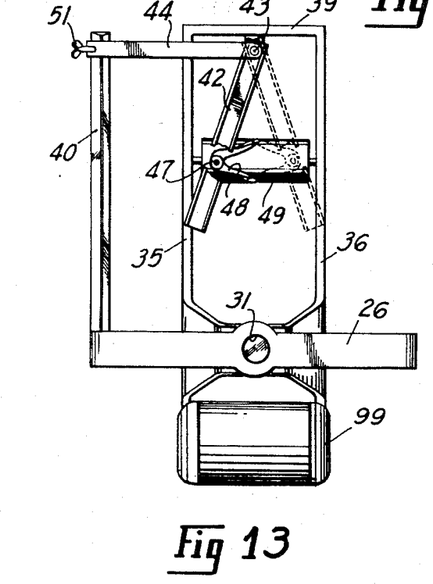
FIGS. 13 and 14 are planned schematic views of the top of the machine showing the oscillating control means.
Figure 14:
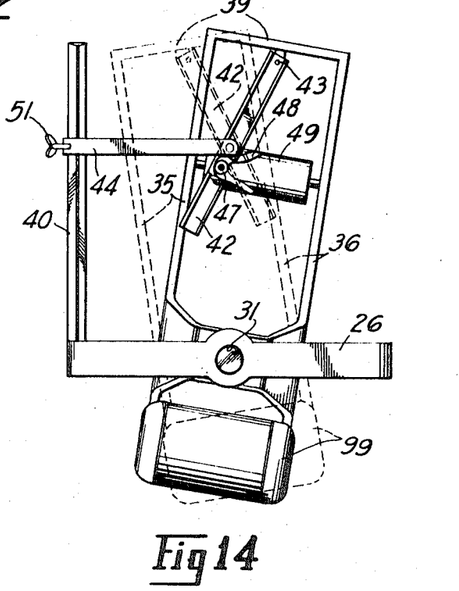

Referring now to FIGS. 1, 13 and 14, the subframe 30 is detailed for oscillating movement on the base frame 20 about the pivotal connection 31. Fixed to the base frame adjacent an upwardly extended end of leg member 24 is a rearwardly projecting arm 40. Pivotally connected at 43 to an ear 41 formed on the subframe cross member 39 is a forwardly extending channel-shaped link 42. The link 42 is interconnected with arm 40 by a selectively adjustable sliding element 44 which has formed on one end a shaped collar portion 45 detailed to be slidable on arm 40. Supported on the opposite end of element 44 is a pivot roller 46 which is detailed to be slidable within the channel of link 42. Connected to the underside of channel-shaped link 42 is a cam follower roller 47 which is detailed to engage and follow a spiral shaped cam notch 48 formed in the surface of a rotatable cam 49. Cam 49 is rotatably supported (by conventional means not shown) on an upstanding bracket 50 fixed to the subframe arms 35, 36. The vertical dimensions of the bracket 50 and cam 49 are detailed such that the link 42 is supported in substantially the same horizontal plane as the fixed rearwardly extending arm 40. Rotation of cam 49 will effect a movement of cam follower roller 47 along the spiral cam notch 48 thereby causing the link 42 to pivot about the pivotal connection 43. Adjustment of the sliding element 44 along fixed arm 40 to a position shown in FIG. 13 will position the pivot roller 46 directly above the pivotal connection 43 between link 42 and ear 41. In this position subframe 30 is held in a fixed position relative to the base frame 20 and link 42 will only pivot about pivotal connection 43. Movement of slidable element 44 along fixed arm 40 to position the pivot roller 46 at a spaced location (as shown in FIG. 14) from pivot connection 43 will provide a secondary pivot point for link 42 and movement of cam follower roller 47 along the spiral cam notch 48 will effect an oscillation of the subframe 30 relative to the base frame 20. The degree of oscillation of the subframe 30 relative to base frame 20 is selectively settable by sliding the element 44 along fixed arm 40 to vary the distance between pivot roller 46 and pivotal connection 43. The slidable element 44 is held in a selected position by a threaded lock member 51. A scale 52 is provided on the fixed arm 40 indicating the degree of angle of oscillation of the subframe when the slidable element 44 is set at a particular point on the scale.

FILE SUPPORT AND CONTROL MEANS

Referring now to FIGS. 1, 2, 8 and 12, the sharpening device includes a file support and control means 60 for supporting a conventional saw sharpening file 61 between a pair of file holders 62, 63. The file holders 62, 63 are secured, respectively, to a pair of downwardly projecting tabs 64, 65 formed on the underside of the forward end of an elongated link 66. Fixed to the top of link 66 adjacent the forward end is a substantially inverted channel-shaped bracket 67 which includes leg portions 68, 69 and a base portion 70. The top of link 66 and the bracket 67 forms an elongated guide track means 71. The rearwardly extending end of link 66 is pivotally connected at 72 to the lower end of an arm 73 which is pivotally supported at 74 adjacent the subframe cross member 39. The forward end of link 66 is supported for reciprocating movement by a plurality of rollers 75, 76, 77 which are rotatably mounted on the forward ends of a pair of links 78, 79. The read ends of links 78, 79 are connected at 80 (FIG. 2) to the subframe bracket 50. The rollers 75, 76 are detailed in supporting relationship on the links 78, 79 in such a manner that roller 75 will rotate about a vertical axis and track along one side edge of the base portion 70 of bracket 67 and roller 76 will also rotate about a vertical axis and track along an opposite side edge of base portion 70 at a rearwardly spaced location. Roller 77 is supported in such a manner that it will rotate about a horizontal axis and track along the underside of the base portion 70 and within the guide track means 71. The rollers 75, 76, 77 will provide a positive guide means which will permit a fore and aft reciprocating movement of link 66 and supported file 61.

Figures 7, 8, 9, 10, 11:
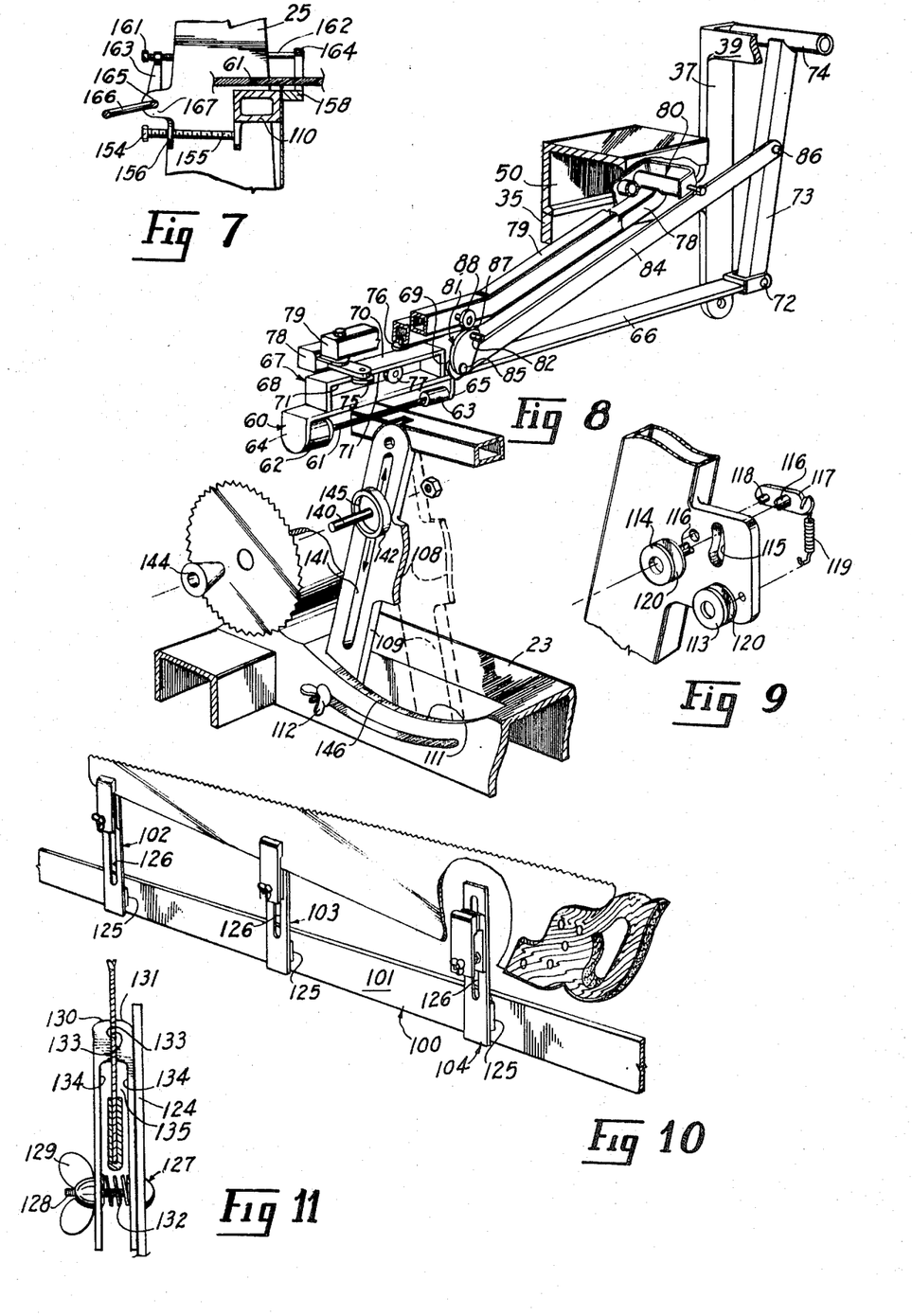
FIG. 7 is a vertical sectional view taken along lines 7—7 of FIG. 5.
FIG. 8 is a fragmentary perspective view of the machine showing the file support and control means.
FIG. 9 is an exploded fragmentary perspective of the machine, drawn on a larger scale, showing the details of a carriage roller support.
FIG. 10 is a perspective view of the carriage showing a saw clamped in a position to be sharpened.
FIG. 11 is a vertical sectional view taken transversely of a supported saw showing the details of a saw clamp.
Figure 12:
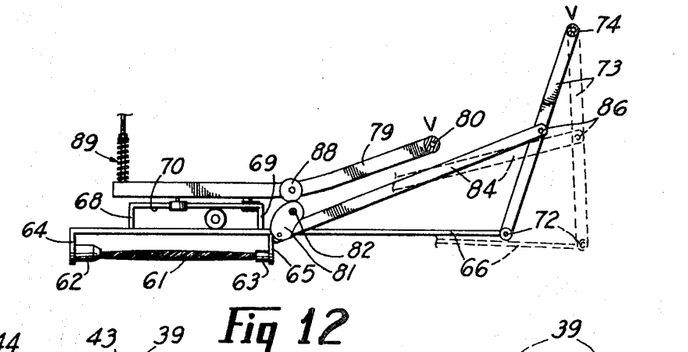
FIG. 12 is a fragmentary side elevational view of the file support and control means shown in FIG. 8.
Figure 15:
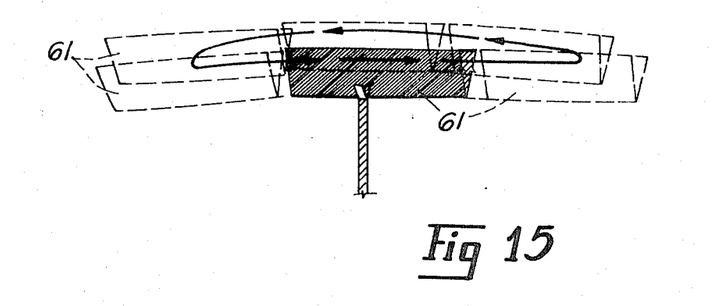
FIG. 15 is a side elevational schematic view showing the file stroke during a sharpening operation.

As shown in FIG. 8, the reciprocating movement of link 66 and file 61 is effected by a rotary crank element 81. Crank element 81 is fixed to a shaft 82 which is journaled for rotation within a bracket 83 secured to the underside of subframe 30. The reciprocating motion of the link 66 and file 61 is effected by a link 84 which is pivotally connected at one end to a stud shaft 85 on the rotary crank 81 and pivotally connected at its opposite end at 86 to an intermediate portion of arm 73. The rotary crank 81 is provided with a detailed cam surface 87 which is in engagement with a roller 88 rotatably supported on link 79 directly above cam surface 87. The cam surface 87 is detailed to effect an oscillating movement of the link 66 and file 61 about the pivotal connection 72. The combination of the reciprocating motion provided by crank 81 through link 84 and oscillating motion provided by crank cam surface 87 through roller 88 will produce an orbital movement in a vertical plane of the file 61 as shown in FIG. 15. The roller 88 is yieldably held against the crank cam surface 81 by an adjustable spring biasing mechanism 89 which is mounted between a forward end of link 78 and the underside of subframe motor bracket 33 by conventional means not shown.

POWER CONTROL MEANS

Referring to FIG. 1, the power for operating the oscillating cam member 49 and the motion transmitting crank 81 is provided by a motor 90 mounted on motor support surface 34. The motor 90 includes a gear reduction housing 91 and an output drive sprocket 92. Drive from sprocket 92 is delivered by a chain 93 to a sprocket 94 fixed to the oscillating cam member 49 and to a sprocket 95 fixed to the support shaft 82 of crank element 81. The cam notch 48 includes a continuous notch defining two spiral camming portions separated by two dwell portions. The cam notch spiral camming portion will effect an oscillating movement of the subframe from one limit of oscillating movement during a degree of rotary cam movement and the cam dwell portions will maintain the subframe in each of the limits during a degree of rotary cam movement. The driving relationship between sprocket 94 and 95 is detailed such that the rotary crank 81 makes a 360° rotation for each 180° of rotation of the oscillating cam 49. The purpose of the driving relationship will be described herein below in the description of the operation of the machine.

SAW SUPPORT MEANS

Referring now particularly to FIGS. 1 and 8–11, a carpenter's hand saw is supported on the sharpening device for a sharpening operation by a carriage 100 which includes a carriage rail 101 and a series of spaced saw clamps 102, 103, and 104. The carriage rail 101 is supported for lateral movement by two pairs of laterally projecting support brackets 107 formed integral with the base frame leg 25. The second pair of rollers 106 is supported on a laterally projecting bracket 108 formed integral with support arm 109 which is pivotally mounted on an intermediate cross member 110 of the base frame 20. The lower end of arm 110 is slidably supported within a slot 111 formed in the base frame lower cross member 23. The arm 110 is adjustable along the slot 111 and is held in a selected adjusted position by a locking means 112, the purpose of which will be described hereinbelow.

When the arm 110 is locked in the leftmost position as shown in FIG. 1, the second pair of rollers 106 are in correct horizontal alignment with the first pair of rollers 105 for supporting the carriage rail 101 in a horizontally oriented laterally movable position. Each of the pairs of rollers 105, 106 include a lower rotatable roller 113 (FIG. 9) supported on the respective support bracket in a fixed vertical position and a movable upper roller 114. The upper roller 114 of each pair is supported for vertical swinging movement in an arcuate slot 115 by a stud shaft 116 (FIG. 9). The stud shaft 116 is secured to a link 117 which is pivotally connected by a second stud shaft 118 to the bracket support. The location of the pivotal stud shaft 118 is detailed to allow the roller stud shaft 116 to be movable within arcuate slot 115. A tension spring 119 is connected between an extended end of link 117 and a stud shaft (not shown) which supports the lower rollers 113. Spring 119 will urge the upper roller 114 downwards in slot 115 or clorkwise about stud shaft 118, but will allow the upper roller 114 to yield upwardly. Each of the rollers is provided with a gravel surface 120 detailed to accommodate and guide the carriage rail 101 and the four guide rollers are detailed to support each roller grove in a common vertical plane to provide a smooth roller guide surface for the carriage rail 101.

As shown in FIG. 10, the carriage rail 101 includes three saw clamps 102, 103, and 104 spaced laterally along rail 101 to provide adequate support along the length of a supported saw. Each of the saw clamps 101–103 includes a vertically oriented backing plate 124 (FIG. 11) which is secured to the carriage rail 101 by a spacer element 125 (FIG. 10). The spacer 125 is detailed in dimensions to space the backing plate sufficiently from the rail 101 to allow the guide rollers 113, 114 to track along the edges of the carriage rail without contacting either the spacer 125 or backing plate 124. Each of the backing plates 124 includes an elongated vertically oriented slot 126 which receives an adjustable connector 127. The adjustable connectors 127 include a threaded bolt 128 and a complementary threaded wing nut 129. Supported between the backing plate 124 and wing nut 129 are a pair of clamping jaws 130, 131. The threaded bolt 128 is inserted through the slot 126 and openings (not shown) in each of the clamping jaws 130, 131. A coiled compression spring 132 is positioned on the threaded bolt 128 between the clamping jaws 130, 131 to bias the jaws apart. The adjustable connector 127 and elongated slot 126 will allow the clamping jaws 130, 131 to be vertically positioned along the backing plate 124 for correct alignment with a saw to be supported. Each of the clamping jaws 130, 131 includes a first saw contacting surface 133 and a recessed surface 134. The clamping jaw surfaces 133, 134 are detailed to provide an open area 135 (FIG. 11) for receiving a reinforcing element of special types of hand saws. The saw carrier is so designed that it will hold carpenter's hand saws, miter boxsaws and most keyhole or compass saws without special attachments. The saw clamping elements 101, 102, 103 are detailed to support and guide a saw well below the cutting teeth, with the upper edge of the saw adjacent the cutting teeth being guided by a special guide means which will be described hereinbelow.

Referring now to FIG. 8, a circular skill saw is supported on the support arm 109. The circular saw support attachment includes a threaded element 140 which is inserted through an elongated slot 141 provided in the support arm 109. A drum shaped backing element 142 is secured to the threaded element 140 on the front side of arm 109 with a lock nut 143 threaded on the element 140 on the back side of arm 109. The threaded element 140, drum-shaped element 142 and locking nut 143 are detailed to allow the circular saw attachment to be selectively positioned along the slot 141 to accommodate different diameters of circular saws. A circular saw is secured to the threaded element 140 by a cone-shaped locking nut 144 which is detailed to include threads complementary to the threaded element 140. The drum-shaped backing element 142 is detailed to include a recess cup 145 for receiving the cone-shaped locking nut 144. The cone-shaped locking nut 144 is detailed to be inserted into a center opening on a circular saw, with the cone-shaped locking nut 144 passing through the circular saw center opening sufficiently to provide a firm bearing surface for the saw and at the same time align the circular saw axis in such a manner as to be concentric with the axis of the threaded element 140. The cone-shaped locking nut 144 is threaded onto element 140 until the back surface of the saw contacts the backing drum 142 to trap the circular saw between the locking nut 144 and backing drum 142. As described hereinabove, the support arm 109 is selectively adjustable along a slot 111 and is held in a selected adjusted position by a locking means 112. The purpose of this adjustment is to allow correct alignment of circular saws having different hook angles of the cutting teeth without changing the hook angle of the sharpening file. An indicator scale 146 is provided adjacent the slot 111 for indicating the hook angle of the cutting teeth of a supported saw relative to the sharpening file.

Referring now to FIGS. 1 and 5–7, the edge of a saw adjacent the cutting teeth is guided and supported by a releasable clamp guide means 150 which includes two guide surfaces 151, 152. Guide surface 151 is formed on the intermediate cross member 110 of the base frame 20. The cross member 110 is pivotally connected adjacent one end at 153 (FIG. 5) to the base frame leg 24 and adjustably supported at its opposite end (FIG. 7) by a thread adjustment means 154. The adjustment means 154 includes a threaded bolt 155 which is threaded through a tab 156 on leg 25. The extended end of bolt 155 is journaled for rotatable non-axial movement (by conventional means, not shown) in a second tab 157 formed integral with the underside of cross member 110. The purpose of the adjustment means 154 is to insure correct alignment of the guide surface 151 with the file stroke of a sharpening file.

As shown in FIG. 5, the second guide surface 152 is formed on a vise clamping arm 158. Arm 158 is pivotally supported adjacent one end at 159 to an outwardly curved ear member 160 formed on base frame leg 24 and adjustably supported adjacent its opposite end by a thread adjustment means 161. The adjustment means 161 includes a threaded bolt 162 which is threaded through an end portion of a crank arm control means 163. The extended end of bolt 162 is journaled for rotatable non-axial movement (by conventional means, not shown) in the extended opposite end 164 of arm 158. Crank arm 163 is fixed to a shaft 165 which is journaled in a pair of rearwardly projecting tabs 166, 167 formed integral with base frame legs 24, 25, respectively. Fixed to the shaft 165 intermediate the legs 24, 25 is a rearwardly projecting semi-circular bearing surface 168. Movement of shaft 165 to clamp the guide surface 152 against guide surface 151 is effected by a cam 169 fixed to shaft 82 between drive sprocket 95 and support bracket 83. A cam follower roller 170 is supported for engagement with the cam 169. Roller 170 is rotatably supported at one end of a support link 171 which is pivotally supported at 172 between the lower ends of the sub-frame T-shaped members 37, 38. Roller 170 is spring biased into contact with cam 169 by a tension spring 173 which is connected between an intermediate portion of link 171 and subframe arm 36. A bearing member 174 is secured to the link 171 adjacent the roller 170 and is detailed to contact and bear against bearing surface 168. A rotary camming movement of cam 169 will force roller 170 downward, thus causing bearing member 174 to effect a clockwise movement of shaft 165 and crank 163 to clamp surface 152 against surface 151. The guide surfaces 151, 152 are detailed to allow an edge of a supported saw to be guided therebetween. A clamping of guide surface 152 against surface 151 will clamp a supported saw adjacent the cutting edge to prevent vibration of the saw during sharpening operation. Cam 169 is detailed to effect a counterclockwise movement of shaft 165 and crank 163 to release a saw clamped or locked between surfaces 151, 152 to allow a lateral indexing movement of the saw as will be described hereinbelow. The semi-circular bearing surface 168 is detailed to insure contact by the bearing member 174 during all degrees of oscillating movement of the subframe 20.

SAW INDEXING MEANS

As described hereinabove, a saw to be sharpened is supported for indexing movement in a first plane disposed at an angle to the plane of motion of a sharpening file. The purpose of the indexing movement is to serially position each cutting tooth of a saw to a sharpening position. Referring now to FIGS. 2–4, the saw indexing means includes a main L-shaped support and control arm 180. Arm 180 is pivotally supported at 181 to a support collar 182 which is fixed to the base frame leg 24. Arm 180 is supported such that the long leg 183 is disposed substantially horizontally with the short leg 184 depending downwardly therefrom substantially vertically. As shown in FIG. 2, the horizontal leg 183 is detailed in support relationship to overlie and contact the upper surface of link 79. Pivotally connected at 185 to an intermediate portion of the long leg 183 is a downwardly hanging pawl support link 186. Link 186 is adjustably supported relative to the short leg 184 by a threaded abutment bolt 187 which is threaded through an extended end of leg 184. Link 186 is spring biased toward leg 184 and into abutting contact with bolt 187 by a tension spring 188 which is connected between the extended ends of leg 184 and link 186. Link 186 is also spring biased in a clockwise direction about pivot 185 by a tension spring 189 connected between pivotal connection 181 and an extended end of a tab element 190 which is formed integrally with link 186. The L-shaped control arm 183 is spring biased in a clockwise direction (FIG. 3) by a tension spring 191 connected between arm 183 (by conventional means, not shown) and a forwardly projecting ear 192 formed integral with the base frame leg 24. Adjustment of control arm 183 about pivot 181 is effected by a threaded bolt 193 which is threaded through ear 192 into abutting contact with an upper surface of arm 183.

Pivotally supported at 194 to an extended end of support link 186 is an indexing pawl assembly 195 which includes a primary indexing pawl 196 and a secondary indexing pawl 197. The secondary pawl 197 is pivotally supported beneath the primary pawl 196 by a bell crank 198. Bell crank 198 is pivotally supported at 199 to the primary pawl 196. A top horizontally oriented leg 200 of bellcrank 198 includes a threaded adjustment member 201 with the secondary pawl 197 being pivotally connected at 202 to the extended end of a downwardly projecting leg 203. An upwardly projecting tab element 204 is formed integral with the secondary pawl 197 and includes an inwardly bent portion which overlies a portion of the primary pawl 196. The pawl assembly 195, 197 is spring biased clockwise about pivotal connection 199 by a tension spring 205 which is connected between pivotal connection 194 and 202. The extent of clockwise movement of the pawl assembly 195 about pivotal connection 194 is adjustable by the threaded adjustment member 201 which includes a rearwardly projecting portion 206 detailed to overlie a camming surface 207 fixed to the base frame leg 24. The primary pawl 196 and secondary pawl 197 are designed to include laterally spaced shaped end portions which are detailed to engage laterally spaced gullets of a saw. A vertical motion upwardly of link 79 by cam control surface 87 will effect a counterclockwise motion of control arm 183 about pivot 181, thus causing the pawl assembly 195 to move laterally along camming surface 207. As the pawl assembly 195 moves laterally along surface 207, the shaped end portions of pawls 196, 197 will be allowed to move downwardly into engagement with spaced gullets of a saw and a continued movement of the pawl assembly will effect a lateral indexing movement of a saw to present the next tooth of a saw to a sharpening position. A vertical motion downwardly of link 79 will allow the control arm 183 to rotate clockwise about pivot 181, thus causing the pawl assembly to slide leftward along the cam surface 207. A leftward movement of the pawl assembly 195 along cam surface 201 will cause the shaped end portions of pawls 196, 197 to disengage from the saw gullets. The extent of lateral motion rightward (FIG. 4) of the pawl assembly 195 is detailed to effect a one tooth indexing movement of a saw for each indexing operation. The provision of a primary and a secondary pawl 196, 197 will allow the indexing means to index a saw which has missing or broken saw teeth.

OPERATION

A saw filing operation is begun by first placing a saw to be sharpened on the machine in a proper position for sharpening. If the saw to be sharpened is a carpenter's hand saw, the saw is placed on the carriage 100 as shown in FIG. 10, by clamping the saw with the saw clamps 102–104. The saw clamps 102–104 are then adjusted along slots 126 to bring the cutting teeth of the saw to the proper height for sharpening by the file 61. The saw and carriage 100 are moved to an extreme leftward position (FIG. 3) so that the rightmost saw cutting tooth is positioned directly below the file 61.

Should the saw have angular offset cutting teeth, the control slide 44 is then set at a selected position along the scale 52 to condition the oscillating control means 47, 48 etc., to effect automatic adjustment of the file support and subframe to the proper angle of the angular cutting teeth. A manual control switch (not shown) is then moved to an on position to start the motor 90, at which time power drive is delivered by chain 93 to the central cams 49, 81 and 169.

The control cam 81 is detailed for effecting movement of the file 61 in an orbital path in such a manner that the file 61 contacts and sharpens one of the angular saw cutting teeth during one portion of the orbital movement and is separated from the cutting teeth during a second portion of orbital movement, as shown in FIG. 15. It is also to be noted in FIG. 15 that at the beginning of the file stroke the file is inclined slightly downwardly and during the sharpening portion the file moves in a substantially horizontal position which is perpendicular to the plane of the saw. The purpose of this motion is to allow the file to begin the sharpening stroke with a minimum amount of vibration and to move through the saw teeth in such a manner as to leave a sharpened saw tooth having uniform dimensions throughout its thickness.

After the file has moved through the first portion of orbital movement to effect a sharpening of a saw tooth and into the second portion of orbital movement where the file is separated from the saw, the following controls are effected in sequence: The saw clamping means 150 is moved from a clamp locking position by control cam 169 to a reelased position; the indexing pawls 196, 197 are moved rightward (FIGS. 3, 4) by control arm 183 to move the next adjacent saw tooth in a position directly beneath the file 61; and occurring simultaneously with the indexing movement, the subframe 30 and supported file is moved about pivot 31 by the control cam 49 to position the file 61 at an offset angle in proper alignment with the next indexed tooth of the saw and then the file sharpening stroke is repeated by the control crank 81. The above stated sequence of operation is automatically repeated until all the teeth of a supported saw have been sharpened.

Should the saw to be sharpened be a circular saw, the carriage 100 is removed and a circular saw is clamped on the support 140 by cone-shaped member 144 as described hereinabove and the member 140 and saw is adjusted along slot 141 to position the saw cutting teeth at the correct height for sharpening. The oscillating control slide 44 is then positioned at the proper location, the motor is started and the sequence of operation as described relative to a hand saw is repeated until all the teeth on the circular saw have been sharpened.

It now becomes obvious that the above described illustrative embodiment is capable of obtaining the objects and advantages stated hereinabove. It is evident that various modifications in the details of construction may be made by those skilled in the art without departing from the spirit of the invention which is to be limited only by the scope of the appended claims.

I claim:
1. In an automatic sharpening device for use in sharpening a cutting tool comprising in combination:
(a) means on said device for supporting a cutting tool in a first plane at a position to be sharpened;
(b) means on said device for supporting a sharpening means for movement in a second plane disposed at an angle with respect to said first plane, said support means including means permitting angular adjustment of said angle between said planes;
(c) means on said device operatively associated with said support means for effecting movement of said support means in said second plane, said movement in said second plane being detailed such that a supported sharpening means will effect a sharpening of a supported cutting tool; and
(d) control means on said device for effecting automatic angle adjustment between said first and second plane.

2. In an automatic sharpening device as described in claim 1, further characterized in that said control means is selectively settable to a selected one of a plurality of positions for adjusting the degree of said automatic angular adjustment.

3. In an automatic sharpening device as described in claim 1 further characterized in that said control means for effecting said automatic angle adjustment is detailed to effect an angle adjustment between said planes in response to a degree of movement of said sharpening means in said second plane.

4. In a sharpening device as described in claim 3 further characterized that said cutting tool includes a series of angular offset cutting teeth and that said movement of said sharpening means in said second plane is detailed to effect a sharpening of one tooth of said series of cutting teeth during one portion of said movement and to be separated from said cutting teeth during a second portion of said movement and wherein said control means for effecting said automatic angular adjustment is detailed in timed relationship for effecting said automatic angular adjustment during said second portion of movement of said sharpening means.

5. In an automatic sharpening device as described in claim 4 further characterized in that said device includes means on said device for providing indexing movement between a supported cutting tool and a supported sharpening means whereby each tooth of said series of cutting teeth is serially moved to a sharpening position, and wherein said indexing means includes control means operatively associated with said movement of said sharpening means whereby said indexing movement is effected during said second portion of movement of said sharpening means.

6. In an automatic sharpening device as described in claim 5 further characterized in that said device includes clamping means operatively associated with said cutting tool adjacent said sharpening position for movement between a locking position whereby said cutting tool is held in a substantially rigid position during said first portion of sharpening movement and a released position during said second portion of movement and wherein said clamping means includes control means operatively associated with said indexing means and movement of said sharpening means for effecting movement of said clamping means from said locked position to said released position during said second portion of movement of said sharpening means to permit operation of said indexing means.

7. In an automatic sharpening device as described in claim 6 further characterized in that said support means for supporting said cutting tool includes a carriage supported on said device for lateral movement relative to said sharpening means whereby said indexing means will effect an indexed lateral movement of said cutting tool in said first plane.

8. In an automatic sharpening device as described in claim 7 further characterized in that said carriage includes an elongated rail member supported for lateral movement between laterally spaced pairs of roller support elements and wherein one of said roller support elements of each of said pairs is adjustably mounted and biased toward the second roller element of said pair.

9. In an automatic sharpening device as described in claim 8 further characterized in that said carriage includes laterally spaced support clamps detailed for contacting and supporting a cutting tool at laterally spaced points and wherein each of said support clamps includes a pair of adjustable clamp members, said members being detailed in design to define a first pair of contact surfaces for contacting and clamping a cutting tool therebetween and a second pair of surfaces spaced from said first surfaces in such a manner as to define an open area therebetween for receiving a cutting tool reinforcement portion.

10. In an automatic sharpening device as described in claim 5 further characterized in that said support means for supporting said cutting tool includes a rotatable support element mounted on said device for rotary movement relative to said sharpening means whereby said indexing means will effect an indexed rotary movement of said cutting tool in said first plane.

11. In an automatic sharpening device as described in claim 10 further characterized in that said rotatable support element is mounted on said device for laterial adjustment in such a manner that the indexing axis of said cutting tool rotary movement can be adjusted relative to said sharpening means to thereby adjust the angle of the cutting teeth relative to said sharpening means.

12. In an automatic sharpening device as described in claim 5 further characterized in that said indexing means includes feeding means operatively associated with said series of cutting teeth for effecting said indexing movement and wherein said feeding means includes a plurality of feeding pawls detailed in design such that each one of said pawls will contact spaced ones of said series of cutting teeth.

13. In an automatic sharpening device for use in sharpening a cutting tool having a series of cutting teeth comprising, in combination;
(a) means on said device for supporting said cutting tool for lateral indexing movement in a first plane;
(b) control means on said device operatively associated with said cutting tool for effecting said lateral indexing movement, said supporting means and said indexing being detailed in design to sequentially present each tooth of said series of cutting teeth to a sharpening position;
(c) means on said device for supporting a sharpening means for movement in a second plane disposed at an angle with respect to said first plane, said supporting means including pivot support means permitting angular adjustment of said angle between said planes;
(d) control means on said device operatively associated with said support means for effecting orbital movement of said support means in said second plane, said control means being detailed in design such that a supported sharpening means will contact and effect a sharpening of a cutting tool cutting tooth located at said sharpening position during one portion of said orbital movement and such that said sharpening means will separated from said cutting teeth during a second portion of said orbital movement; and,
(e) control means on said device for effecting automatic angle adjustment between said first and second planes, said control means for effecting said automatic angle adjustment is detailed in design to effect an angle adjustment in timed relationship with said sharpening means movement in said second orbital portion.

14. In an automatic sharpening device as described in claim 13 further characterized in that said control means for effecting said indexing movement of said cutting tool and said control means for effecting said orbital movement of said sharpening means includes a first rotary driven cam.

15. In an automatic sharpening device as described in claim 14 further characterized in that said device includes a clamp means mounted on said device for movement between a locking position detailed in design to contact said cutting tool adjacent said sharpening position to lock said cutting tool in a substantially rigid position and a released position for permitting said indexing movement, and wherein said first rotary driven cam is operatively associated with said clamp means for effecting said movement between said locked position and said released position, said operative association of said cam means and said clamp means being detailed such that said clamp means is moved to said locked position during said first portion of said orbital movement of said sharpening means and moved to said released position during said second portion of said orbital movement.

16. In an automatic sharpening device as described in claim 14 further characterized in that said control means for effecting said automatic angle adjustment includes a second rotary driven cam, said second rotary driven cam being driven in timed relationship with said first rotary driven cam in such a manner that said automatic angle adjustment is effected during said second portion of orbital movement of said sharpening means.

17. In an automatic sharpening device as described in claim 16 further characterized in that adjacent ones of said series of cutting teeth include angular offset cutting edges and wherein a cycle of operation of said sharpening device will cause said two cam control means to sequentially effect movement of said clamping means to a locked position, movement of said sharpening means through said first orbital portion to effect a sharpening of one angular cutting edge and simultaneously effect a movement of said clamping means to said released position, indexing of said cutting tool to present a second cutting tooth having an angular offset cutting edge to said sharpening position, and said automatic angular adjustment of said sharpening means to position said sharpening means in alignment with said second angular offset cutting edge.

18. In an automatic sharpening device as described in claim 17 further characterized in that said control means for effecting said automatic angular adjustment includes selectively settable adjustment means operable for varying the degree of said automatic angular adjustment.

19. In an automatic sharpening device for use in sharpening a cutting tool having a series of angular offset cutting edges comprising, in combination:
(a) a base frame means;
(b) means for supporting said cutting tool on said base frame for lateral indexing movement in a first plane;

(c) means on said base frame operatively associated with said cutting tool for effecting said indexing movement;

(d) a subframe pivotally supported on said base frame for movement about an axis disposed in substantially coplanar relationship with said first plane and angularly disposed with respect to said lateral indexing movement;

(e) means on said subframe operatively associated with a portion of said base frame for effecting automatic pivotal adjustment of said subframe about said axis;

(f) support means on said subframe for supporting a sharpening means for orbital movement in a second plane disposed at an angle with respect to said first plane, said orbital movement being detailed in design such that a supported sharpening means will contact and effect a sharpening of a cutting tooth located at said sharpening position during one portion of said orbital movement and such that said sharpening means will be separated from said cutting tooth during a second portion of said orbital movement;

(g) means on said subframe operatively associated with said sharpening means, support means for effecting said orbital movement; and, (h) rotary cam means mounted on said subframe and operatively associated with said indexing means and said means for effecting said orbital movement, said rotary cam means being detailed in design such that said indexing means is effected during said second portion of orbital movement.

20. In an automatic sharpening device as described in claim 19 further characterized in that said automatic pivotal adjustment means is operatively associated with said rotary cam means and wherein said association is detailed in timed relationship such that said automatic pivotal adjustment of said subframe is effected during said second portion of said orbital movement of said sharpening means.

References Cited
UNITED STATES PATENTS

| | | | |
|---|---|---|---|
| 1,135,015 | 4/1915 | Hertz | 76—35 |
| 1,743,893 | 1/1930 | Janson | 76—35 |
| 1,867,240 | 7/1932 | Wardwell | 76—35X |
| 2,267,553 | 12/1941 | Dale | 76—34 |
| 3,114,274 | 12/1963 | Holst | 76—35 |

BERNARD STICKNEY, Primary Examiner